(12) United States Patent
Taylor et al.

(10) Patent No.: US 11,914,664 B2
(45) Date of Patent: Feb. 27, 2024

(54) ACCESSING CONTENT ON A WEB PAGE (71) Applicant: INTERNATIONAL BUSINESS MACHINES CORPORATION, Armonk, NY (US)

(72) Inventors: Paul Taylor, Eastleigh (GB); Gary Stuart Bettesworth, Basingstoke (GB); Matthew John Comer, Southampton (GB); Daniel Del Piccolo, Southsea (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/650,282

(22) Filed: Feb. 8, 2022

(65) Prior Publication Data
US 2023/0252099 A1 Aug. 10, 2023

(51) Int. Cl.
G06F 16/90 (2019.01)
G06F 16/9538 (2019.01)
G06F 16/955 (2019.01)

(52) U.S. Cl.
CPC ...... *G06F 16/9538* (2019.01); *G06F 16/9558* (2019.01)

(58) Field of Classification Search
CPC .................. G06F 16/9538; G06F 16/9558
See application file for complete search history.

(56) References Cited

U.S. PATENT DOCUMENTS

| 7,536,408 | B2 | 5/2009 | Patterson | |
| 9,817,906 | B2 | 11/2017 | Elassaad | |
| 10,156,954 | B2 | 12/2018 | Gutlapalli | |
| 10,691,699 | B2* | 6/2020 | Doerr | G06F 16/9535 |
| 2005/0149499 | A1 | 7/2005 | Franz | |
| 2010/0332967 | A1* | 12/2010 | Kraft | G06F 16/9577 707/769 |
| 2014/0090091 | A1* | 3/2014 | Prakash | G06F 21/6245 726/30 |
| 2015/0379074 | A1 | 12/2015 | Marschner | |
| 2016/0188659 | A1 | 6/2016 | Liu | |
| 2018/0004815 | A1 | 1/2018 | Zhou | |
| 2018/0181675 | A1 | 6/2018 | Lavi | |

(Continued)

OTHER PUBLICATIONS

Chandru, "Finding a time to meet via the Google Calendar API," Kloudless [online], Mar. 1, 2019 [accessed on Jan. 19, 2022], 5 pages, Retrieved from the Internet: <URL: https://kloudless.com/blog/finding-a-time-to-meet-via-the-google-calendar-api/>.

(Continued)

*Primary Examiner* — Kristopher Andersen
(74) *Attorney, Agent, or Firm* — Jordan T. Schiller (57) ABSTRACT A computer-implemented method, computer program product, and computer system for accessing content on a web page. The method accesses a displayed web page in a web browser of a user computing device and receives a search term for content within the web page. The method accesses contextual information held locally on the user computing device and scans the web page to identify one or more portions of content of the web page relevant to the search term and the contextual information. The method provides a display on the user computing device with links to the relevant web page content.

18 Claims, 7 Drawing Sheets (56) References Cited

U.S. PATENT DOCUMENTS

2019/0332650 A1    10/2019  Alon
2022/0318485 A1*   10/2022  Narayanan .............. G06F 40/30

OTHER PUBLICATIONS

Disclosed Anonymously, "Contextually Correlated Personalization Method to Maximize User Experience Performance," IP.com, May 12, 2021, 6 pages, IP.com No. IPCOM000265768D, Retrieved from the Internet: <URL: https://priorart.ip.com/IPCOM/000265768>.

Disclosed Anonymously, "Generating a User-Specific Reduced Content Webpage," IP.com, Jan. 5, 2018, 39 pages, IP.com No. IPCOM000252355D, Retrieved from the Internet: < URL: https://priorart.ip.com/IPCOM/000252355>.

Mell, et al., "The NIST Definition of Cloud Computing", National Institute of Standards and Technology, Special Publication 800-145, Sep. 2011, 7 pages.

Unknown Author, "Geolocation: Displaying User or Device Position on Maps," Google Developers [online], [accessed on Jan. 19, 2022], 4 pages, Retrieved from the Internet: <URL: https://developers.google.com/webmaster-tools/search-console-api-original/v3/how-tos/all-your-data>.

Unknown Author, "Getting all your search data," Google Developers [online], [accessed on Jan. 19, 2022], 6 pages, Retrieved from the Internet: <URL: https://developers.google.com/webmaster-tools/search-console-api-original/v3/how-tos/all-your-data>.

* cited by examiner

ACCESSING CONTENT ON A WEB PAGE

BACKGROUND

The present invention relates to web browser content searching and, more specifically, to accessing content on a web page.

At present, the set of results from a web search are based on the limited amount of information available to a search engine. Security concerns about passing sensitive data outside of a domain means that search results are always going to be generic due to the limited knowledge by a search engine of the user and their search requirements.

Typically, a web search returns multiple possible 'hit' pages, within which the search terms have been found, based on the competence of the search engine. The user selects the mostly likely results page in order to study further the contents. It is common for the specific data being searched to be located deep within a results page. The user is expected to find the required data throughout the page's contents. This extra manual step wastes time and may only lead to the first of many instances of the search term located on the page.

SUMMARY

According to an aspect of the present invention there is provided a computer-implemented method for accessing content on a web page, said method comprising: accessing a displayed web page in a web browser of a user computing device; receiving a search term for content within the web page; accessing contextual information held locally on the user computing device; scanning the web page to identify one or more portions of content of the web page relevant to the search term and the contextual information; and providing a display on the user computing device with links to the relevant web page content.

According to another aspect of the present invention there is provided a system for accessing content on a web page, comprising: a processor and a memory configured to provide computer program instructions to the processor to execute the function of the components: a display access component for accessing a displayed web page in a web browser of a user computing device; a search term input component for receiving a search term for content within the web page; a contextual information accessing component for accessing contextual information held locally on the user computing device; a scanning component for scanning the web page to identify one or more portions of content of the web page relevant to the search term and the contextual information; and a supplementary display component for providing a display on the user computing device with links to the relevant web page content.

According to a further aspect of the present invention there is provided a computer program product for accessing content on a web page, the computer program product comprising a computer readable storage medium having program instructions embodied therewith, the program instructions executable by a processor to cause the processor to: access a displayed web page in a web browser of a user computing device; receive a search term for content within the web page; access contextual information held locally on the user computing device; scan the web page to identify one or more portions of content of the web page relevant to the search term and the contextual information; and provide a display on the user computing device with links to the relevant web page content.

The computer readable storage medium may be a non-transitory computer readable storage medium, and the computer readable program code may be executable by a processing circuit.

BRIEF DESCRIPTION OF THE DRAWINGS

The subject matter regarded as the invention is particularly pointed out and distinctly claimed in the concluding portion of the specification. The invention, both as to organization and method of operation, together with objects, features, and advantages thereof, may best be understood by reference to the following detailed description when read with the accompanying drawings.

Embodiments of the present invention will now be described, by way of example only, with reference to the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION

Embodiments of a method, system, and computer program product are provided for accessing content on a web page.

The method is applied to a displayed web page in a web browser of a user computing device and scans the web page to identify one or more portions of content of the web page relevant to a search term and contextual information obtained locally from the user computing device. A display is provided on the user computing device with links to the relevant web page content.

The access to content on a web page is an improvement in the technical field of information searching and retrieval whilst maintaining security and privacy at a user computing device.

The method may be provided by a post-processing plug-in to a web browser that uses locally-held private and potentially sensitive contextual data to process a resulting web page selected by a user during a web search. The method may also be applied to a web page that is navigated to independently of a web search.

The method and system are described in the context of a web browser used to access the World Wide Web to display web pages from a website provided by a web server. However, the method and system may also apply to a browser used to access an intranet or extranet of an organization.

The context information may be used create a profile of a user based on their search history, location, and other contextual information. The display of the relevant web page content may re-render the web page to present the user with a refined view of the web page tailored to the user profile. For example, this may create a header with relevant page extracts and hotlinks. The display provides the user with a more efficient way of finding exactly what they are searching for within the contents of the results page rather than simply being presented with the whole page.

Figure 1:
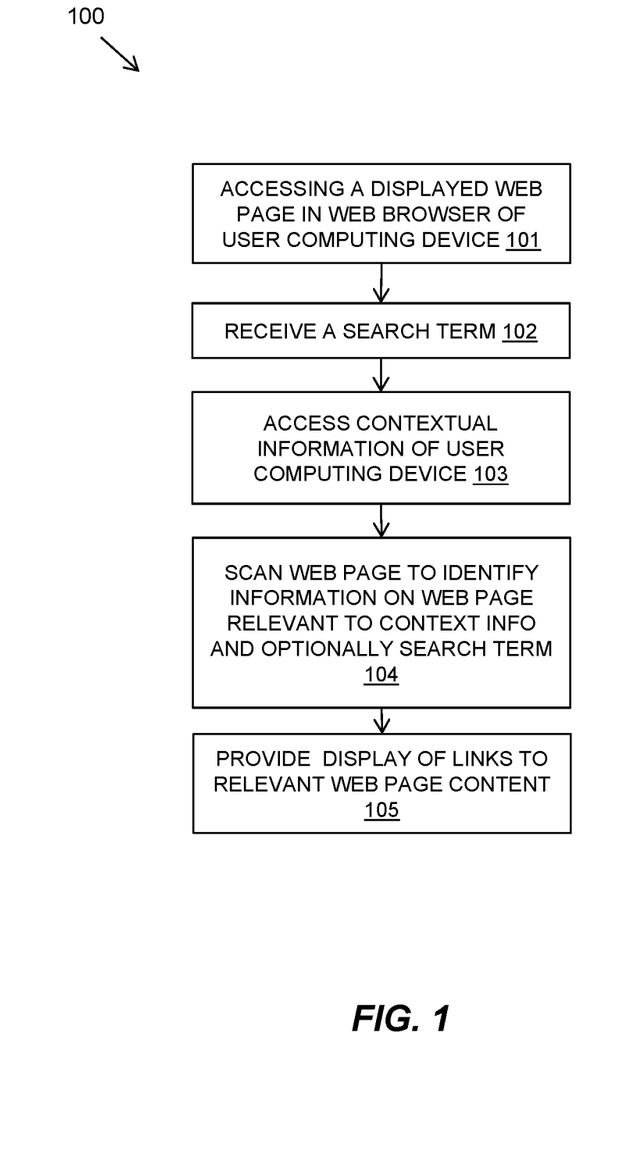
FIG. 1 is a flow diagram of a first example embodiment of a method in accordance with embodiments of the present invention.

Referring to FIG. 1, a flow diagram 100 shows an example embodiment of the described method for accessing content on a web page accessed on a user computing device via a web browser.

The method may access 101 a displayed web page in a web browser of a user computing device. The web page may be the selected result of a search carried out by a search engine via the web browser using a search term. Alternatively, the web page may be navigated to directly in the web browser, for example using a Uniform Resource Locator (URL).

The method receives 102 a search term for content within the displayed web page. The search term may be the search term that was used to find the web page in a search carried out by a search engine. Alternatively, it may be a search term entered into a search field for searching within the content of the displayed web page. A search term may be a combination of terms used successively during the refinement of a search.

The method may access 103 contextual information held locally on the user computing device. The contextual information may be held locally in a dedicated store in the form of user-provided contextual information. For example, this may be configured by the user and updated as required. Alternatively, the contextual information may be accessed from the operating system and/or applications on the user computing device. The user may set preferences for the contextual information with access permission to the resources of the user computing device. The context information may include location, preferred search topics, a calendar schedule, etc.

The method may scan 104 the web page to identify information in the web page content relevant to the search term and the contextual information. The scanning may identify one or more portions of relevant content of the web page. The scanning may parse the contents of the web page for possible matches to the search term filtered by the contextual information.

Using recent search terms, as well as a current search term, with the local context, locates to all relevant information that the user has recently searched on that may be present somewhere on the web page.

The method may provide 105 a display on the user computing device with extracts and links to the relevant web page content. This may be provided as a re-rendering of the web page including an area displaying a summary of one or more of relevant web page content and an associated link to the content. For example, this re-rendering can be done by creating a header that contains dynamically created page extracts and hotlinks.

The method may be used as a post-search processing of a selected web page of a search to make the contents easier to consume and more relevant. The described method does not tamper or modify a search results list; instead, once the user has chosen their preferred page from the results list, then the method may be used as a post-search processing to precis or modify the selected web page's contents. In this way, the relevant content is summarized, and a link provided for access to the relevant portions. The relevant portions may match the user's original search while also using any accessible local context information.

The method is secure as it does not need to expose private or sensitive user information outside of the user's computing device in order to refine search results. The local processing of the method filters the search results according to the private contextual information that a user may be unable or unwilling to share with a web server or search engine.

The method may be installed locally on the client side in a user's browser and may be provided for all web page content visited by the user. The display provided by the method may be as a re-rendering or a separate window display or other appropriate user interface method. The method does not require the exposure, outside of the local device, of any local, private contextual information or interests. Therefore, the method has no effect on the findings of a web search, but rather affects the results that are viewed by the user.

Figure 2:
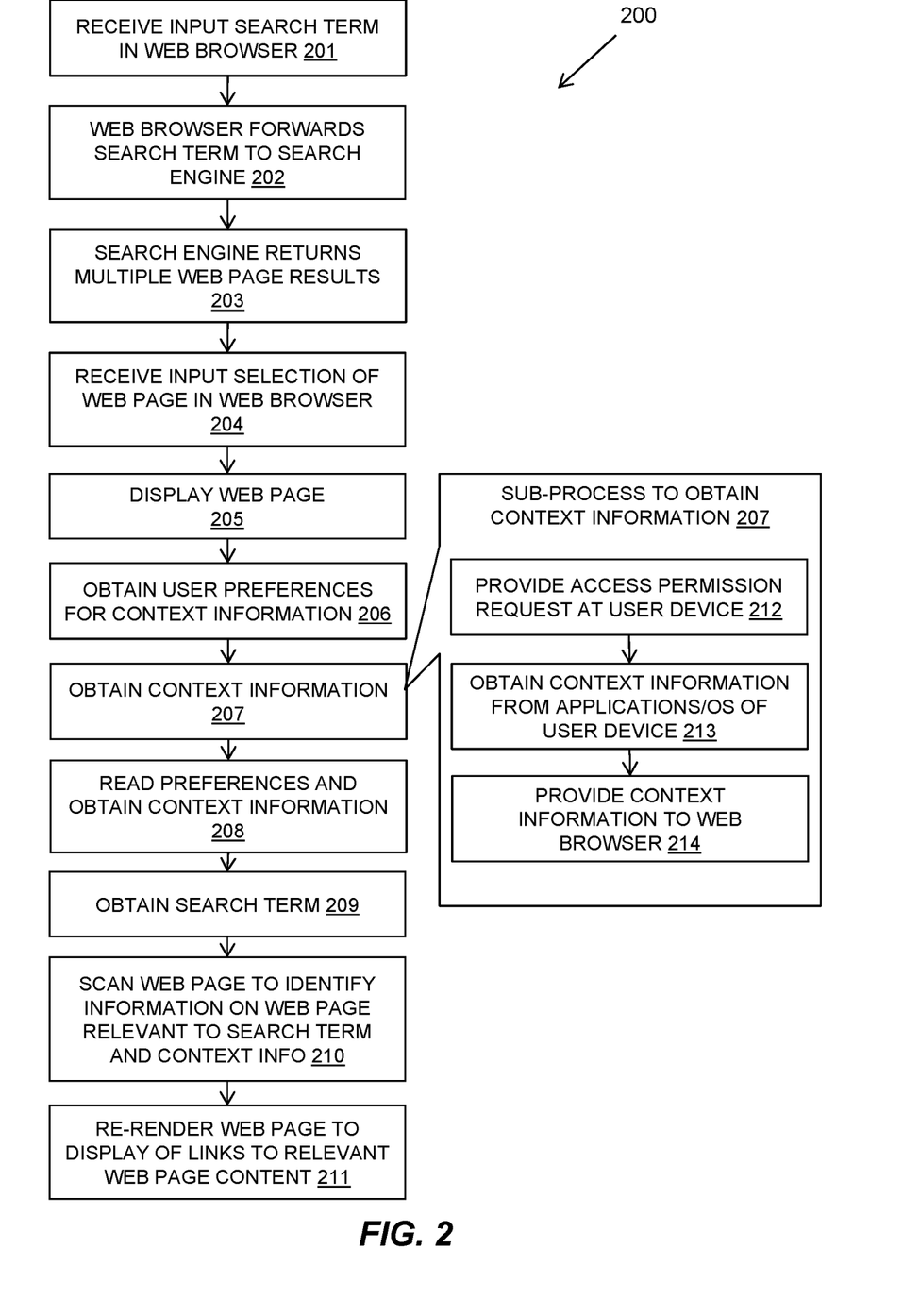
FIG. 2 is a flow diagram of a second example embodiment of a method in accordance with embodiments of the present invention.

Referring to FIG. 2, a flow diagram 200 shows a more detailed example embodiment of the described method applied after a search carried out by a search engine.

The method may receive 201 a search term input by a user into a web browser that forwards 202 the search term to a search engine. The search engine may return 203 multiple web page results that are provided as a list in the web browser display. The web browser receives 204 a user input selection of one of the web pages of interest to the user and may display 205 the web page. The user may select this by opening the web page in the current browser window replacing the list of search results or may open the web page in a separate tab or window.

The method may obtain 206 user preferences for context information to be applied to the web page and may obtain 207 the context information. The method may use a sub-process 207 to obtain the context information from the local user computing device on which the web browser is executing. The sub-process may provide 212 access permission requests at the user computing device and may obtain 213 the requested context information from the operating system and/or one or more applications of the user computing device. The context information may be provided 214 to the web browser.

The web browser may read 208 the preferences for the context information and the context information itself. The web browser may also obtain the search term 209 that was used in the search.

The method may scan 210 the web page to identify information in the web page content that is relevant to the search term and to the context information. The method may re-render 211 the web page or otherwise display a reference or summary of the relevant content and links to the relevant content.

Figure 3:
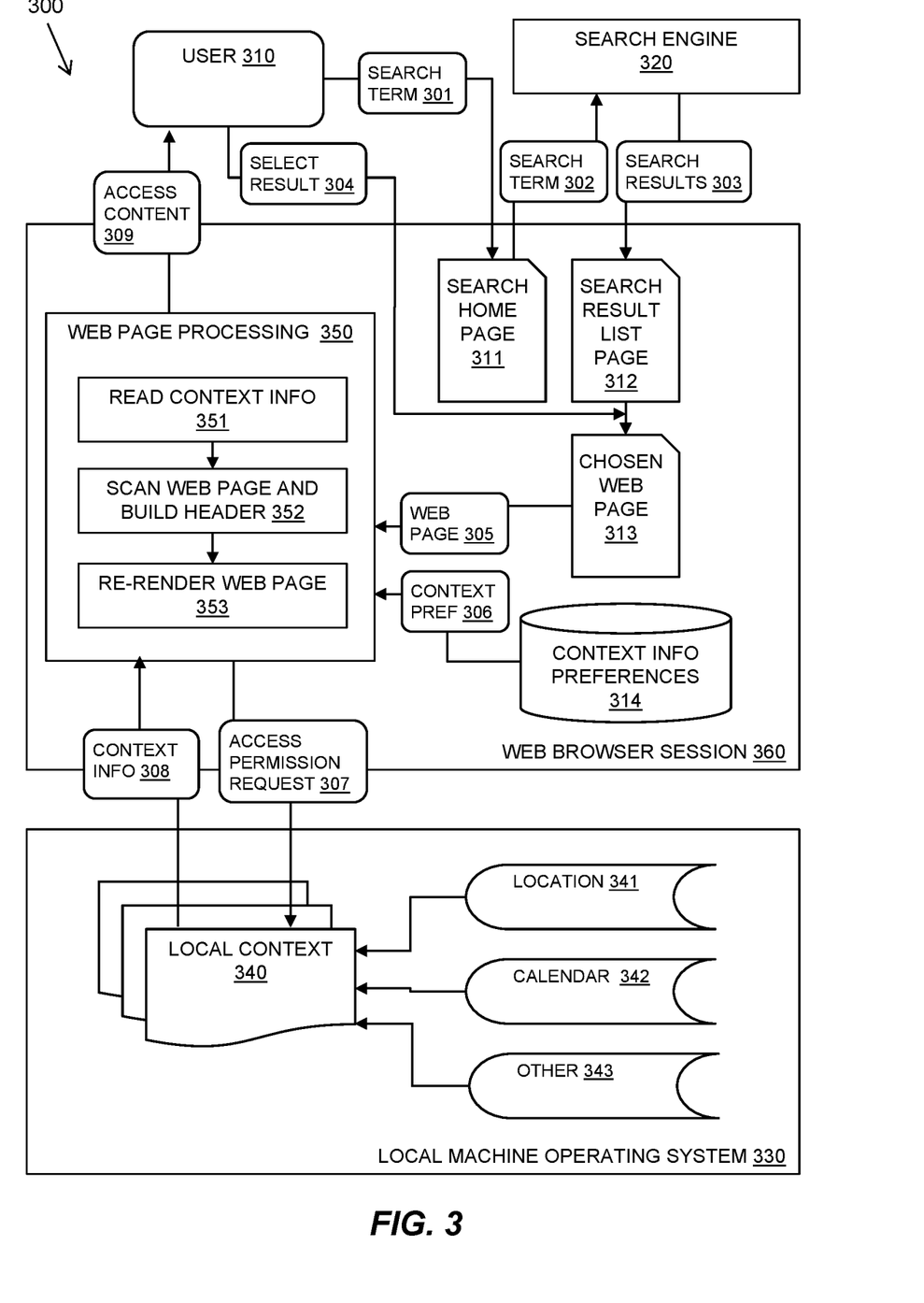
FIG. 3 is a schematic flow diagram of an example embodiment of a method in accordance with embodiments of the present invention.

This method is further illustrated in the schematic flow diagram 300 of FIG. 3 in which a web browser session 360 is shown and a local machine operating system 330. A user 310 enters a search term 301 into a search home page 311 of the web browser session 360. The search term 302 is sent to a search engine 320 and search results 303 are returned and displayed in the web browser session 360 as a search result list page 312. The user 310 selects a result 304 of the search result list page 312 and the chosen web page 313 is displayed in the web browser session 360.

The web browser session 360 includes access to context information preferences 314 that are stored for the user providing preferences of the context information that they want to apply when accessing web page content.

A web page processing 350 is provided in the form of a plug-in to the web browser. The web page processing 350 receives the web page 305 and the context information preferences 306. The web page processing 350 sends access permission requests 307 to the local machine operating system 330 that provides access to the local contexts 340, such as location information 341, calendar event information 342, and other 343 context information. The obtained context information 308 is provided to the web page processing 350.

The processing of access permission requests 307, obtaining the local context information 340 from the appropriate sources and returning 308, this may make use of standard application processing interface (API) calls to various applications that store a user's local context data, such as calendar schedule, location, preferred search topics, etc. Pulling of information may be achieved as known for various application types.

To obtain search data, search analytic data can be accesses using an API on a periodic basis, such as a daily query, and types of data may be selected. Similarly, geolocation data may be obtained using a browser's geolocation feature. Calendar APIs may match location details recorded in the calendar either on a particular day or in a date range. This may be applied when searching for events or courses, for example. Calendar APIs may also be used to find event titles to extract areas of interest.

The web page processing 350 reads 351 the context information, scans 352 the web page and builds a display in the form of a header of the web page and re-renders 353 the web page.

This method uses locally-held data to process the selected result of a web search to highlight information on the page that is of specific importance to the user.

The web page processing 350 makes use of a set of local, contextual information to re-render the search result page to highlight the most relevant parts of its contents, depending on the user's requirements. The contents of the page that are highlighted are determined by the original search terms and, locally-held contextual information such as location available from location services of the operating system, availability derived from the user's calendar application, and known areas of interest derived from a recent search history of the user to generate a list of interests. A list of interests may be maintained, including search terms harvested from recent web browser sessions or searches, and/or manually entered by the user during setup of preferences for the web page processing 350.

One example of re-rendering is the building of a header section that contains extracts in the page of the found search terms and also quick links to those extracts. The re-rendered page provides a quick reference panel for the user to navigate quickly to the part of the page that closely matches their search and other criteria; this saves the user time by avoiding manually 'finding' the search terms within the page.

The described system provides a processing component that executes as a plug-in on a web browser and is applied to a web page. This may be a web page that is the selected result page from a web search or may be any web page viewed on the web browser. The term "web browser" is intended to be interpreted broadly to include accessing intranets and extranets as well as the World Wide Web.

The processing component takes as input a web page. It then scans that page for details of a search term and locally-held contextual data it is given access to, such as user's location, availability, and wider interests to re-render the results page to highlight the most relevant parts of the page. Local user settings for the processor component will give access to location, availability, and other locally-stored information. These settings directly affect the amount of processing that can be performed on the search results page.

The re-rendered highlights provide the user with a more efficient way of finding exactly what they are searching for, within the contents of a web page, rather than simply being presented with the whole page and then expected to search further for the information most relevant to them.

The described method can be applied to any results page selected by a user from a web search or to a page accessed directly. To illustrate, an example user scenario is presented below. The following assumption is made: the user has granted the new plug-in access to their locally-held location and availability (via their calendar), and also a recent history of their searches to construct a list of 'interests'.

The user begins a new search in an internal corporation domain for "quantum computer". The search engine finds a set of relevant web pages containing the search terms and reports the ranked results, based on its perceived relevance and popularity, as indexed by the search engine. The user refines their search by entering another search term for "quantum education". The search engine performs another search and reports the ranked results, effectively refining the results, based on its knowledge of the user's search session so far. This aspect of the search is hidden from the user but assumed to occur, to return more relevant search results. The user, who is still refining their search, then searches on "education sessions". The search engine returns the relevant results for "quantum education sessions", based on its history of the user's cumulative search session so far and, to some degree, the country where they appear to be searching from. The user completes their search and reviews the set of results, choosing a results page that appears at first glance to offer what they want.

As soon as the results page is selected, the described post-search plug-in intercepts that page and begins scanning its contents in preparation for constructing a new header that will precis the most relevant parts of the page. The contents of the header are intended to make it easier for the user to navigate to the most relevant parts of the entire page, rather than force the user to search the page contents again using the browser's 'find' function. Contextual data, such as user location, availability, and wider interests are used to refine further the contents of the header. Permissions granted via the plug-in preferences provide more detailed refinement of the header contents.

The following examples assume that a user has provided access permissions to their calendar, schedule, location, employment details, and topics of interest.

Example 1. The user searches for "quantum computing education NYC". The method intercepts the selected search results page and parses the page further for possible matches to quantum computing courses that match the user's 'known' location and schedule that also correspond to those courses found on the page. For example, location and date details in the user's calendar may show availability as "NYC—March 10 to 15". Therefore, searching on "quantum computing education NYC" may yield a hit for courses, if details in the calendar and/or schedule contextual data match.

Example 2. The user searches for "open source licensing problems". The method intercepts the selected search results page and parses the page further to look for details of issues with open source licensing that affect use in a commercial environment (i.e., the user's employer); in this case identifying general public use licensing as being of particular interest. Contextual data for employment and topics of interest identify the employer's commercial use and open source.

Example 3. The user searches for "chocolate cake recipe". The method intercepts the selected search results page and parses the page further for UK-origin gluten-free recipes first, using the context data of location and dietary preferences, as set by the user.

Example 4. The user searches for "lithium ion battery efficiency". The method intercepts the selected search results page and parses the page further for the most recent studies found, as applied to small electric vehicle application, using the contextual data of location and topics of interest.

The original page layout is appended to the new header, to preserve the layout of the search results as defined by the original page's author. The result page, with the new header and followed by the original contents, is rendered for the user.

The method provided as a plug-in to a web browser, means that each page selected from a web search will be processed, according to the preferences of the plug-in and its permissible access to the user's local, contextual data. The relevance of the header's contents on the re-rendered results page is directly affected by how much contextual information is made available to the plug-in and the relevance of that information to the resulting search.

Details found on the page using only a search term may not match other criteria that were not part of the original search but may be relevant, such as details of the user's location, their availability at certain times, and perhaps their other relevant interests.

Existing search engines are advanced and can perform searches that take into account other related searches requested by the user during a typical browser session. However, local contextual information is not available to a search engine and can be difficult to expose externally to help refine the search. Security domain concerns are the main reason why local information is not available as part of the search. However, within the same domain, and certainly within the user's own device, locally-held information is available. Use of this information is made to refine the search results after they are returned to improve the relevance of the search.

Figure 4:
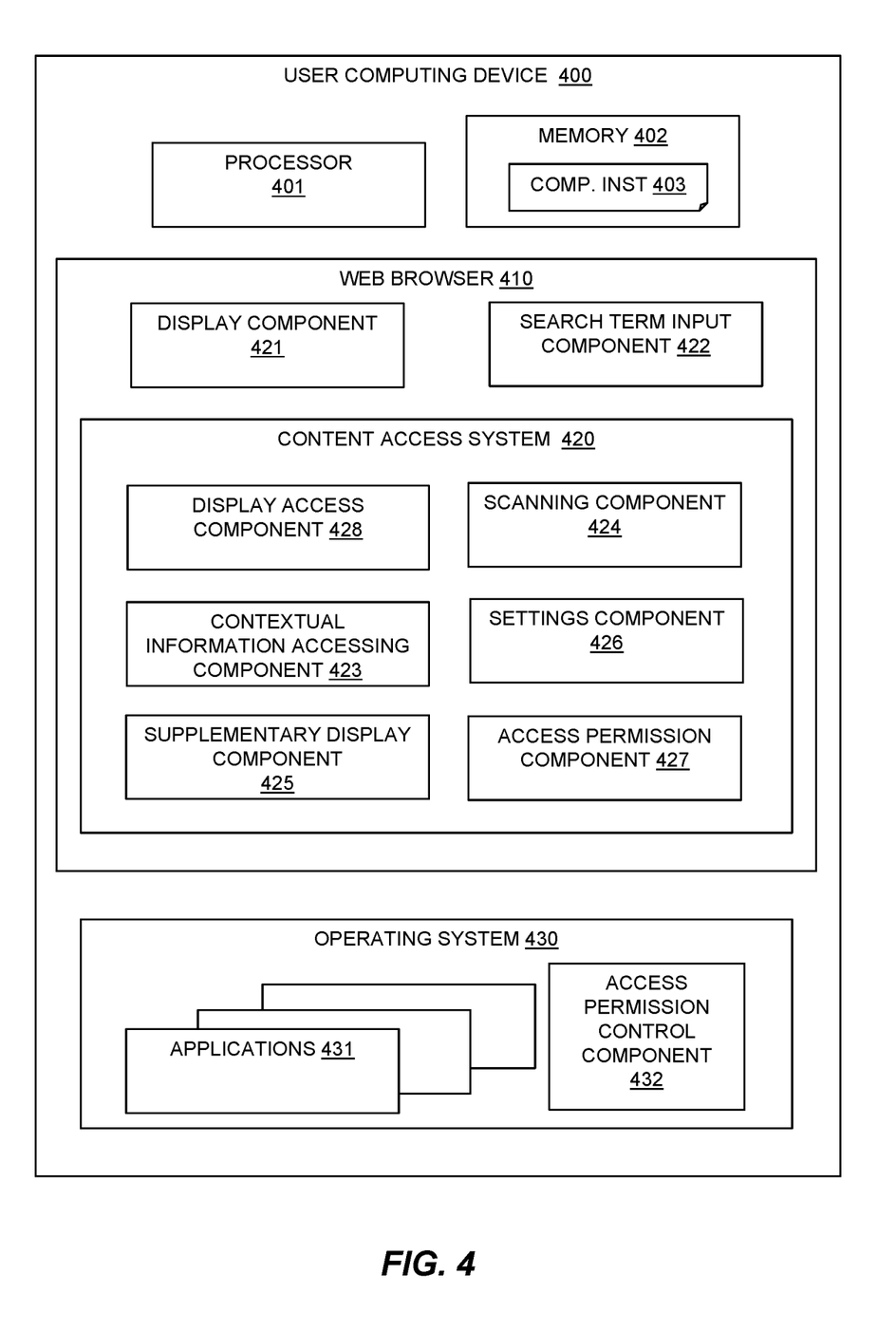
FIG. 4 is block diagram of an example embodiment of a system in accordance with embodiments of the present invention.

Referring to FIG. 4, a block diagram shows a user computing device 400. The user computing device 400 may include at least one processor 401, a hardware module, or a circuit for executing the functions of the described components which may be software units executing on the at least one processor. Multiple processors running parallel processing threads may be provided, enabling parallel processing of some or all of the functions of the components. Memory 402 may be configured to provide computer instructions 403 to the at least one processor 401 to carry out the functionality of the components.

The user computing device 400 may include an operating system 430 and multiple applications 431. The applications 431 may have associated APIs and an access permission control component 432 may be provided to control access to information relating to the operating system 430 and applications 431.

The user computing device 400 includes a web browser 410 with a content access system 420 that may be provided as a plug-in to the web browser 410. The web browser 410 may include a display component 421 for displaying a web page in the web browser 410. The web browser 410 may also include a search term input component 422 for receiving a search term for content within a displayed web page. The search term input component 422 may receive the search term from a search engine as the term used to identify the web page or may receive the search term as input in a search field of the web page. The search term may be a combination of historical terms input by the user.

The content access system 420 may include a display access component 428 for accessing a displayed web page in the web browser 410. The content access system 420 may include a contextual information accessing component 423 for accessing contextual information held locally on the user computing device. The contextual information accessing component 423 may accesses a dedicated store of user-provided contextual information or may access contextual information from one or more applications 431 and/or the operating system 430 of the user computing device 400 via access permissions. The content access system 420 may include a settings component 426 for setting preferences for contextual information by receiving input from the user including any required access permissions.

The content access system 420 may include a scanning component 424 for scanning the web page to identify one or more portions of content of the web page relevant to the search term and the contextual information.

The content access system 420 may include a supplementary display component 425 for providing a display on the user computing device with links to the relevant web page content. The supplementary display component 425 may re-render the web page including an area displaying a summary of the one or more portions of content and an associated link to each of the portions.

Figure 5:
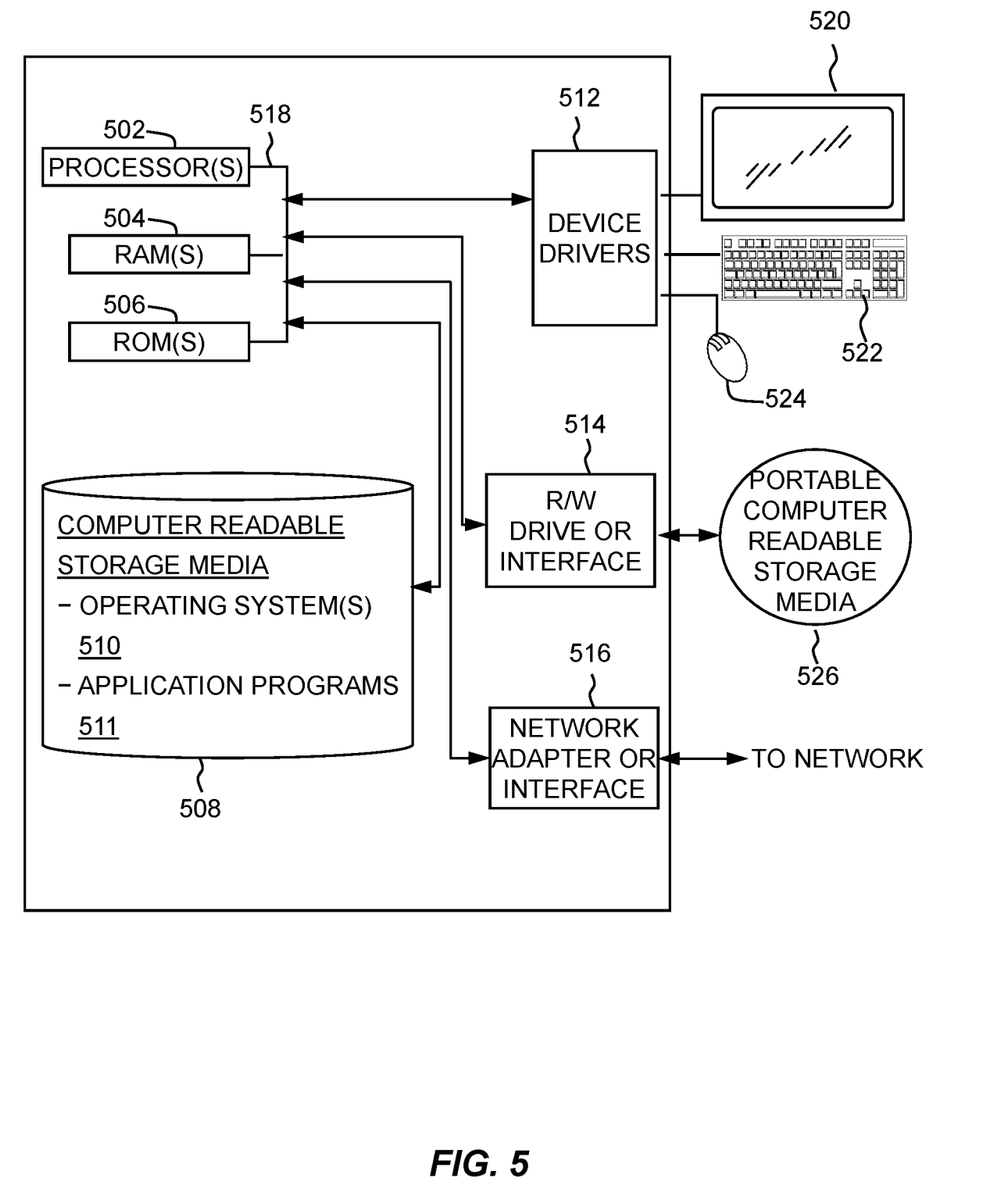
FIG. 5 is a block diagram of an embodiment of a computer system or cloud server in which embodiments of the present invention may be implemented.

FIG. 5 depicts a block diagram of components of a computing system as used for the user computing device 400, in accordance with an embodiment of the present invention. It should be appreciated that FIG. 5 provides only an illustration of one implementation and does not imply any limitations with regard to the environments in which different embodiments may be implemented. Many modifications to the depicted environment may be made.

The computing system can include one or more processors 502, one or more computer-readable RAMs 504, one or more computer-readable ROMs 506, one or more computer readable storage media 508, device drivers 512, read/write drive or interface 514, and network adapter or interface 516, all interconnected over a communications fabric 518. Communications fabric 518 can be implemented with any architecture designed for passing data and/or control information between processors (such as microprocessors, communications and network processors, etc.), system memory, peripheral devices, and any other hardware components within the system.

One or more operating systems 510, and application programs 511, such as the content access system 420 are stored on one or more of the computer readable storage media 508 for execution by one or more of the processors 502 via one or more of the respective RAMs 504 (which typically include cache memory). In the illustrated embodiment, each of the computer readable storage media 508 can be a magnetic disk storage device of an internal hard drive, CD-ROM, DVD, memory stick, magnetic tape, magnetic disk, optical disk, a semiconductor storage device such as RAM, ROM, EPROM, flash memory, or any other computer readable storage media that can store a computer program and digital information, in accordance with embodiments of the invention.

The computing system can also include a R/W drive or interface 514 to read from and write to one or more portable computer readable storage media 526. Application programs 511 on the computing system can be stored on one or more of the portable computer readable storage media 526, read via the respective R/W drive or interface 514 and loaded into the respective computer readable storage media 508.

The computing system can also include a network adapter or interface 516, such as a TCP/IP adapter card or wireless communication adapter. Application programs 511 on the computing system can be downloaded to the computing device from an external computer or external storage device via a network (for example, the Internet, a local area network or other wide area networks or wireless networks) and network adapter or interface 516. From the network adapter or interface 516, the programs may be loaded into the computer readable storage media 508. The network may comprise copper wires, optical fibers, wireless transmission, routers, firewalls, switches, gateway computers and edge servers.

The computing system can also include a display screen 520, a keyboard or keypad 522, and a computer mouse or touchpad 524. Device drivers 512 interface to display screen 520 for imaging, to keyboard or keypad 522, to computer mouse or touchpad 524, and/or to display screen 520 for pressure sensing of alphanumeric character entry and user selections. The device drivers 512, R/W drive or interface 514, and network adapter or interface 516 can comprise hardware and software stored in computer readable storage media 508 and/or ROM 506.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Cloud Computing:

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
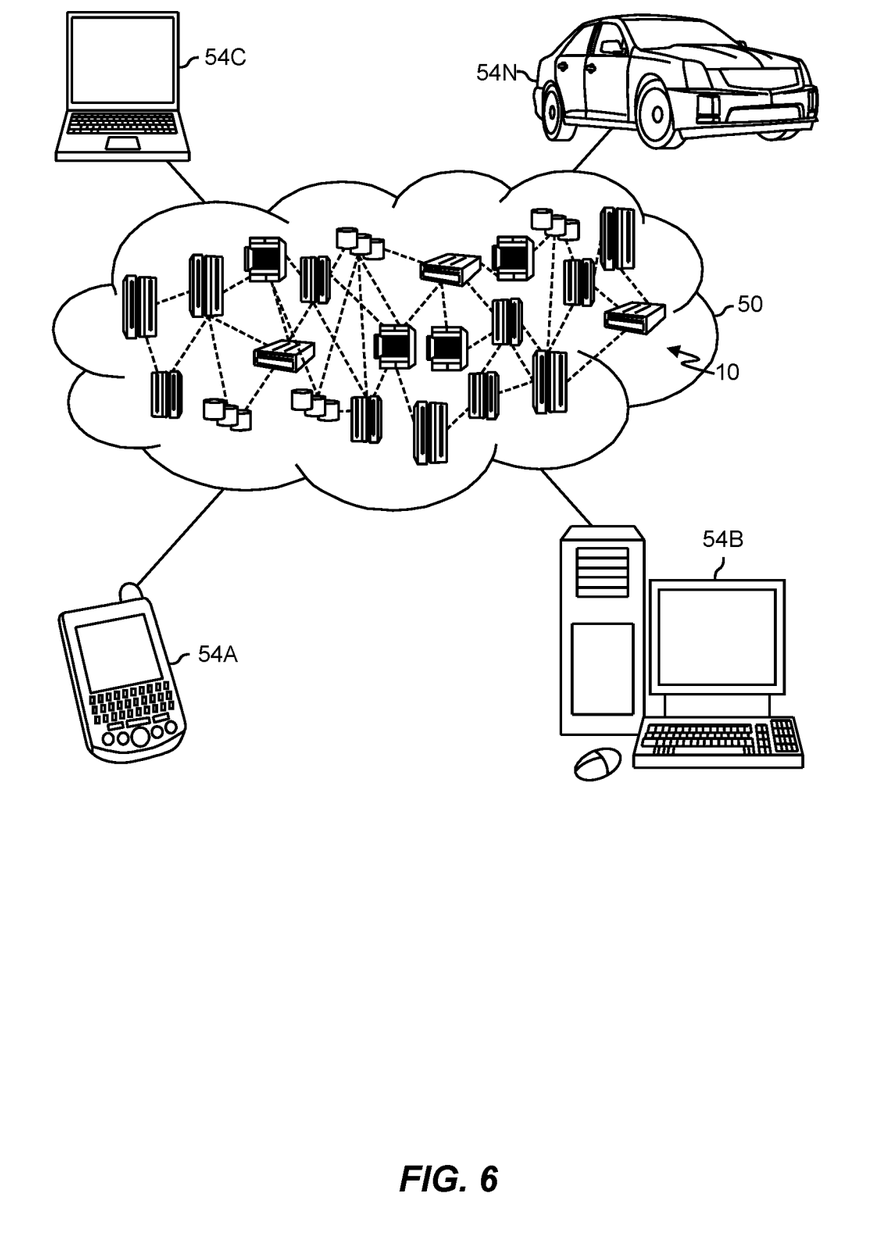
FIG. 6 is a schematic diagram of a cloud computing environment in which embodiments of the present invention may be implemented.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
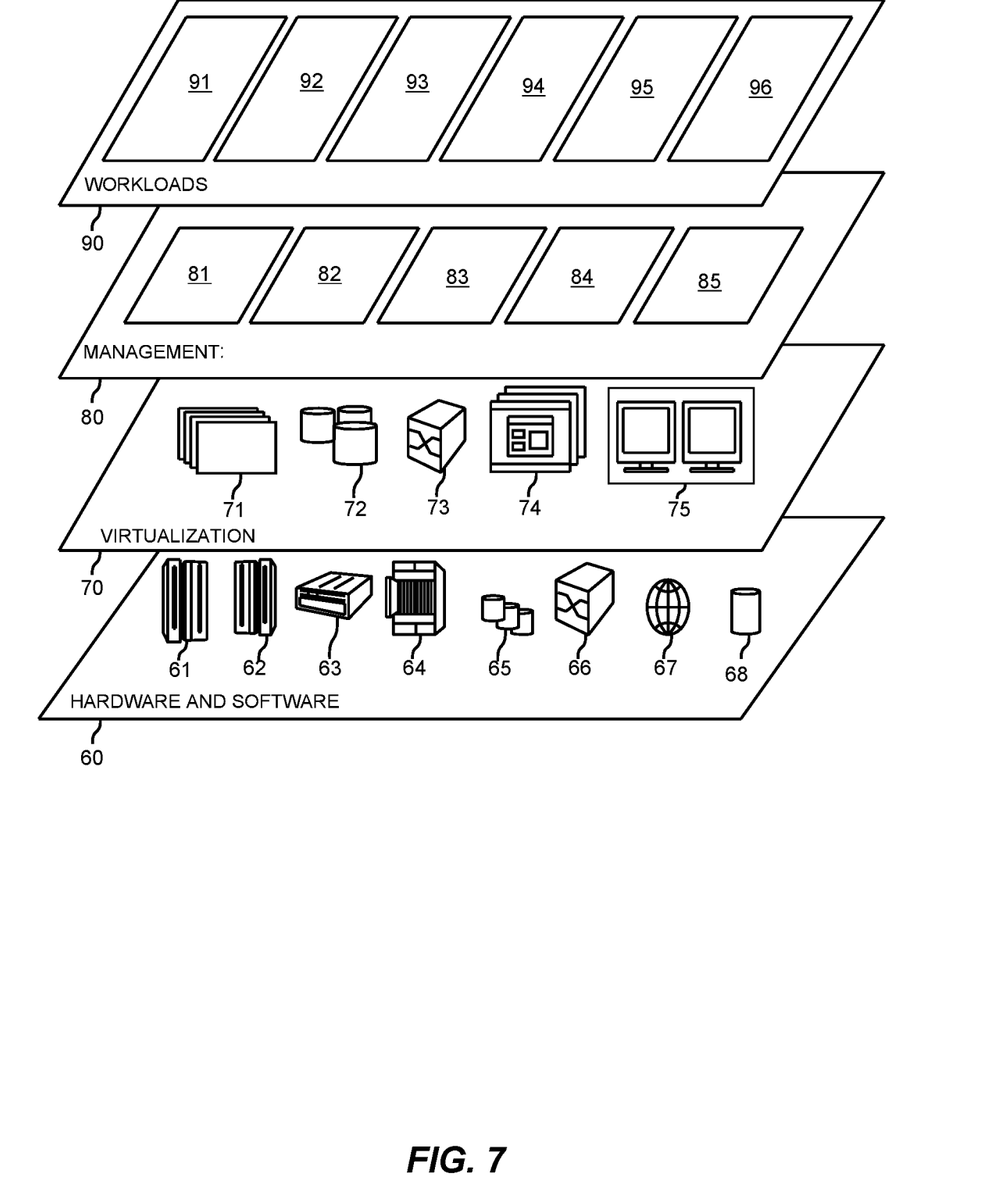
FIG. 7 is a diagram of abstraction model layers of a cloud computing environment in which embodiments of the present invention may be implemented.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and content access processing 96.

A computer program product of the present invention comprises one or more computer readable hardware storage devices having computer readable program code stored therein, said program code executable by one or more processors to implement the methods of the present invention.

A computer system of the present invention comprises one or more processors, one or more memories, and one or more computer readable hardware storage devices, said one or more hardware storage device containing program code executable by the one or more processors via the one or more memories to implement the methods of the present invention.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Improvements and modifications can be made to the foregoing without departing from the scope of the present invention.

What is claimed is:

1. A computer-implemented method for accessing content on a web page, said method comprising:
   accessing a displayed web page in a web browser of a user computing device;
   receiving a search term for content within the web page;
   accessing private contextual information of the user held locally on the user computing device, via a post-processing plug-in to the web browser, wherein the private contextual information of the user comprises known areas of interest derived from a recent search history of the user to generate a list of interests of the user;
   scanning the web page to identify one or more portions of content of the web page matching the search term and the private contextual information of the user;
   providing a display on the user computing device with links to the one or more portions of content of the web page matching the search term and the private contextual information of the user;
   creating a user profile based on user search history, user location, and other private contextual information of the user; and
   re-rendering the web page to present the user with a refined view of the web page tailored to the user profile.

2. The computer-implemented method of claim 1, wherein the search term is a combination of historical terms input over a time period.

3. The computer-implemented method of claim 1, wherein the search term is received from a search engine as a term used to identify the web page or is received in a search field associated with the web page.

4. The computer-implemented method of claim 1, wherein providing a display on the user computing device includes an extract of the web page content in combination with a link for each content portion.

5. The computer-implemented method of claim 1, wherein accessing contextual information held locally accesses a dedicated store of user-provided contextual information.

6. The computer-implemented method of claim 1, wherein accessing contextual information held locally accesses contextual information from one or more applications and/or an operating system of the user computing device via access permissions.

7. The computer-implemented method of claim 6, wherein the contextual information includes location and/or availability information obtained from location and calendar services respectively provided by the one or more applications and/or the operating system.

8. The computer-implemented method of claim 6, wherein the contextual information includes topics of interest as gathered from the one of more applications and/or the operating system.

9. The computer-implemented method of claim 1, including setting preferences for contextual information by receiving input from a user including any required access permissions.

10. The computer-implemented method of claim 1, wherein providing a display includes re-rendering of the web page including an area displaying a summary of the one or more portions of content and an associated link to each portion of content.

11. A system for accessing content on a web page, comprising:
one or more computer devices each having one or more processors and one or more tangible storage devices; and
a program embodied on at least one of the one or more tangible storage devices, the program having a plurality of program instructions, the program instructions comprising instructions for:
accessing a displayed web page in a web browser of a user computing device;
receiving a search term for content within the web page;
accessing private contextual information of the user held locally on the user computing device, via a post-processing plug-in to the web browser, wherein the private contextual information of the user comprises known areas of interest derived from a recent search history of the user to generate a list of interests of the user;
scanning the web page to identify one or more portions of content of the web page matching the search term and the private contextual information of the user; and
providing a display on the user computing device with links to the one or more portions of content of the web page matching the search term and the private contextual information of the user;
creating a user profile based on user search history, user location, and other private contextual information of the user; and
re-rendering the web page to present the user with a refined view of the web page tailored to the user profile.

12. The system of claim 11, wherein the search term is received from a search engine as a term used to identify the web page.

13. The system of claim 11, wherein the search term is received as input in a search field associated with the web page.

14. The system of claim 11, the program instructions further comprising instructions for:
accessing a dedicated store of user-provided contextual information.

15. The system of claim 11, the program instructions further comprising instructions for:
accessing contextual information from one or more applications and/or an operating system of the user computing device via access permissions.

16. The system of claim 11, the program instructions further comprising instructions for:
setting preferences for contextual information by receiving input from a user including any required access permissions.

17. The system of claim 11, wherein re-rendering the web page includes an area displaying a summary of the one or more portions of content and an associated link to each of the portions.

18. A computer program product for accessing content on a web page, the computer program product comprising a computer readable storage medium having program instructions embodied therewith, the program instructions executable by a processor to cause the processor to:
access a displayed web page in a web browser of a user computing device;
receive a search term for content within the web page;
access private contextual information of the user held locally on the user computing device, via a post-processing plug-in to the web browser, wherein the private contextual information of the user comprises known areas of interest derived from a recent search history of the user to generate a list of interests of the user;
scan the web page to identify one or more portions of content of the web page matching the search term and the private contextual information of the user;
provide a display on the user computing device with links to the one or more portions of content of the web page matching the search term and the private contextual information of the user;
create a user profile based on user search history, user location, and other private contextual information of the user; and
re-render the web page to present the user with a refined view of the web page tailored to the user profile.

* * * * *